(12) United States Patent
Erdozain, Jr. et al.

(10) Patent No.: US 10,661,894 B1
(45) Date of Patent: May 26, 2020

(54) IN-FLIGHT RECONFIGURABLE HYBRID UNMANNED AERIAL VEHICLE

(71) Applicant: Amazon Technologies, Inc., Seattle, WA (US)

(72) Inventors: Jack Erdozain, Jr., Homestead, FL (US); Berk Ozturk, Cambridge, MA (US); Nicholas Hampel Roberts, Seattle, WA (US); Brian C. Beckman, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/383,280

(22) Filed: Apr. 12, 2019

Related U.S. Application Data

(63) Continuation of application No. 15/390,273, filed on Dec. 23, 2016, now Pat. No. 10,392,108, which is a
(Continued)

(51) Int. Cl.
*B64C 29/02* (2006.01)
*B64C 39/02* (2006.01)
(Continued)

(52) U.S. Cl.
CPC ............... *B64C 29/02* (2013.01); *B64C 1/30* (2013.01); *B64C 3/56* (2013.01); *B64C 39/024* (2013.01);
(Continued)

(58) Field of Classification Search
CPC .. B64C 29/02; B64C 1/30; B64C 3/56; B64C 2201/021; B64C 2201/088; B64C 2201/102; B64C 2201/128; Y02T 50/14
(Continued)

(56) References Cited

U.S. PATENT DOCUMENTS 1,556,414 A 10/1925 Arnold
1,793,056 A 2/1931 Carns
(Continued)

FOREIGN PATENT DOCUMENTS

DE 907502 C 3/1954
GB 2490141 A 10/2012
(Continued)

OTHER PUBLICATIONS

Design World, "DZYNE Creates a New Approach to Vertical Takeoff and Landing (VTOL): Rotate the Wings," YouTube, May 14, 2015, 4:11, URL: https://www.youtube.com/watch?v=-cCoPBGq-iA, accessed on Apr. 22, 2019.
(Continued)

*Primary Examiner* — Christopher P Ellis
(74) *Attorney, Agent, or Firm* — Athorus, PLLC

(57) ABSTRACT

This disclosure is directed to an unmanned aerial vehicle ("UAV") that transitions in-flight between vertical flight configuration and horizontal flight configuration by changing an orientation of the UAV by approximately ninety degrees. The UAV may include propulsion units that are coupled to a wing. The wing may include wing segments rotatably coupled together by pivots that rotate to position the propulsion units around a center of mass of the UAV when the fuselage is oriented perpendicular with the horizon. In this vertical flight configuration, the UAV may perform vertical flight or hover. During the vertical flight, the UAV may cause the wing to extend outward via the pivots such that the wing segments become positioned substantially parallel to one another and the wing resembles a conventional fixed wing. With the wing extended, the UAV assumes a horizontal flight configuration that provides upward lift generated from the wing.

20 Claims, 13 Drawing Sheets

Related U.S. Application Data continuation of application No. 14/524,956, filed on Oct. 27, 2014, now Pat. No. 9,550,567.

(51) Int. Cl.
   *B64C 1/30* (2006.01)
   *B64C 3/56* (2006.01)

(52) U.S. Cl.
   CPC .. *B64C 2201/021* (2013.01); *B64C 2201/088* (2013.01); *B64C 2201/102* (2013.01); *B64C 2201/108* (2013.01); *B64C 2201/128* (2013.01); *B64C 2201/162* (2013.01); *B64C 2201/18* (2013.01); *Y02T 50/14* (2013.01)

(58) Field of Classification Search
   USPC ............................ 244/7 B, 46, 49, 7 R, 45
   See application file for complete search history.

(56) References Cited

U.S. PATENT DOCUMENTS

| | | |
|---|---|---|
| 1,846,992 A | 2/1932 | Cecil |
| 1,848,389 A | 3/1932 | Igor |
| 2,481,379 A | 9/1949 | Zimmerman |
| 2,572,421 A | 10/1951 | Abel |
| 2,674,422 A | 4/1954 | Luigi |
| 2,678,783 A | 5/1954 | Francis |
| 2,708,081 A | 5/1955 | Dobson |
| 3,081,964 A | 3/1963 | Quenzler |
| 3,179,354 A * | 4/1965 | Alberto Alvarez-Calderon ......... B64C 23/00 244/12.4 |
| 3,231,221 A | 1/1966 | Platt |
| 3,246,861 A | 4/1966 | Alfred |
| 3,350,035 A | 10/1967 | Schlieben |
| 3,439,890 A | 4/1969 | Stits |
| 3,519,224 A | 7/1970 | Boyd et al. |
| 3,666,209 A | 5/1972 | Taylor |
| 3,937,424 A | 2/1976 | Meier et al. |
| 3,966,142 A | 6/1976 | Corbett et al. |
| 4,085,911 A | 4/1978 | Nahodyl |
| 5,094,412 A | 3/1992 | Narramore |
| 5,192,037 A | 3/1993 | Moorefield |
| 5,356,094 A | 10/1994 | Sylvain |
| 5,395,073 A | 3/1995 | Rutan et al. |
| 5,405,105 A | 4/1995 | Kress |
| 5,407,150 A | 4/1995 | Sadleir |
| 5,765,783 A | 6/1998 | Albion |
| 5,769,359 A | 6/1998 | Rutan et al. |
| 5,839,691 A | 11/1998 | Lariviere |
| 5,863,013 A | 1/1999 | Schmittle |
| 5,941,478 A | 8/1999 | Schmittle |
| 7,118,066 B2 | 10/2006 | Allen |
| 7,699,261 B2 | 4/2010 | Colten et al. |
| 8,070,090 B2 | 12/2011 | Tayman |
| 8,146,855 B2 | 4/2012 | Ismailov |
| 8,157,203 B2 | 4/2012 | Kinsey et al. |
| 8,157,206 B2 | 4/2012 | Gionta et al. |
| 8,167,234 B1 | 5/2012 | Moore |
| 8,505,846 B1 | 8/2013 | Sanders |
| 8,800,912 B2 | 8/2014 | Oliver |
| 8,991,751 B2 | 3/2015 | Page et al. |
| 9,259,984 B2 | 2/2016 | Brown |
| 9,452,820 B1 | 9/2016 | Wirth |
| 9,550,567 B1 | 1/2017 | Erdozain et al. |
| 9,555,873 B1 | 1/2017 | Alley et al. |
| 9,676,488 B2 | 6/2017 | Alber |
| 9,682,774 B2 | 6/2017 | Paduano et al. |
| 9,714,090 B2 | 7/2017 | Frolov et al. |
| 9,731,816 B2 | 8/2017 | Harris et al. |
| 9,731,818 B2 | 8/2017 | Dekel et al. |
| 9,821,909 B2 * | 11/2017 | Moshe ...................... B64C 3/38 |
| 9,902,489 B2 | 2/2018 | Fisher et al. |
| 10,059,442 B2 | 8/2018 | Olm et al. |
| 10,252,798 B2 * | 4/2019 | Petrov ................. B64C 29/0033 |
| 2006/0278757 A1 | 12/2006 | Kelleher |
| 2010/0171001 A1 | 7/2010 | Karem |
| 2011/0042507 A1 | 2/2011 | Seiford |
| 2011/0121131 A1 | 5/2011 | Elson |
| 2012/0097801 A1 | 4/2012 | Barrett |
| 2013/0008997 A1 | 1/2013 | Gentile |
| 2014/0117150 A1 | 5/2014 | Good et al. |
| 2015/0225071 A1 | 8/2015 | Tighe |
| 2015/0225072 A1 | 8/2015 | Torre |
| 2015/0266571 A1 | 9/2015 | Bevirt et al. |
| 2015/0375860 A1 | 12/2015 | Hong et al. |
| 2016/0023527 A1 | 1/2016 | Dietrich |
| 2016/0159468 A1 * | 6/2016 | Harris, III ............... B64C 25/14 244/102 R |
| 2016/0185444 A1 | 6/2016 | Gionta et al. |
| 2016/0378120 A1 | 12/2016 | Creasman |
| 2017/0008625 A1 | 1/2017 | Olm et al. |
| 2017/0072755 A1 | 3/2017 | Zhou et al. |
| 2017/0190412 A1 | 7/2017 | Bunting et al. |
| 2017/0217594 A1 | 8/2017 | Bacon et al. |
| 2017/0217596 A1 | 8/2017 | Bacon et al. |
| 2017/0217597 A1 | 8/2017 | Bacon et al. |
| 2017/0217598 A1 | 8/2017 | Bacon et al. |
| 2017/0369150 A1 | 12/2017 | Finklea et al. |
| 2018/0002003 A1 | 1/2018 | Won et al. |
| 2018/0079484 A1 | 3/2018 | Ross et al. |
| 2018/0257778 A1 | 9/2018 | Tian et al. |
| 2018/0339771 A1 * | 11/2018 | Oldroyd .............. B64C 29/0033 |
| 2018/0372464 A1 | 12/2018 | Dylla et al. |
| 2019/0144108 A1 * | 5/2019 | McCullough ........... B64C 39/08 244/23 B |
| 2019/0322365 A1 * | 10/2019 | Gaffney ................. B64C 39/024 |
| 2019/0322366 A1 * | 10/2019 | Gaffney .................... B64C 3/32 |

FOREIGN PATENT DOCUMENTS

| | | | |
|---|---|---|---|
| WO | 2014177589 A1 | 11/2014 | |
| WO | WO-2016200502 A2 * | 12/2016 | ........... B64C 39/024 |
| WO | 2017037698 A1 | 3/2017 | |
| WO | WO-2017131834 A2 * | 8/2017 | ............... B64C 3/40 |
| WO | 2017173732 A1 | 10/2017 | |

OTHER PUBLICATIONS

Michelhaugh, T. A. et al., "Wing-Folding Mechanism of the Grumman Wildcat," Amer. Soc. Mech. Eng. Brochure, https://www.asme.org/wwwasmeorg/media/ResourceFiles/AboutASME/Who%20We%20Are/Engineering%20History/Landmarks/238-Grumman-Wildcat-Sto-Wing-Wing-folding-Mechanism.pdf, May 15, 2006.

* cited by examiner

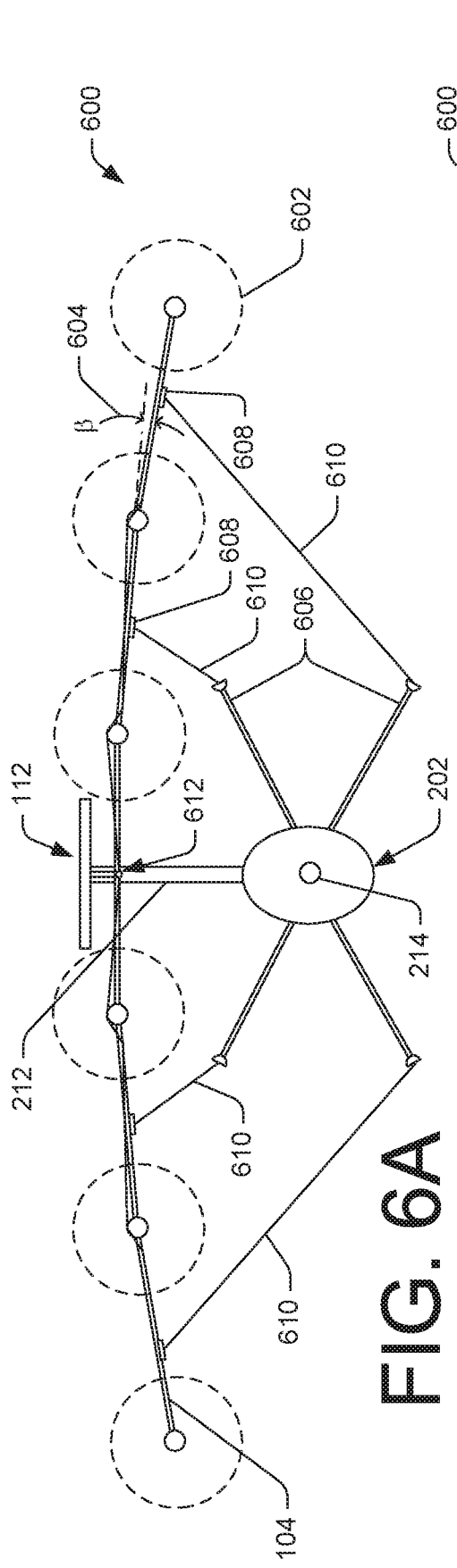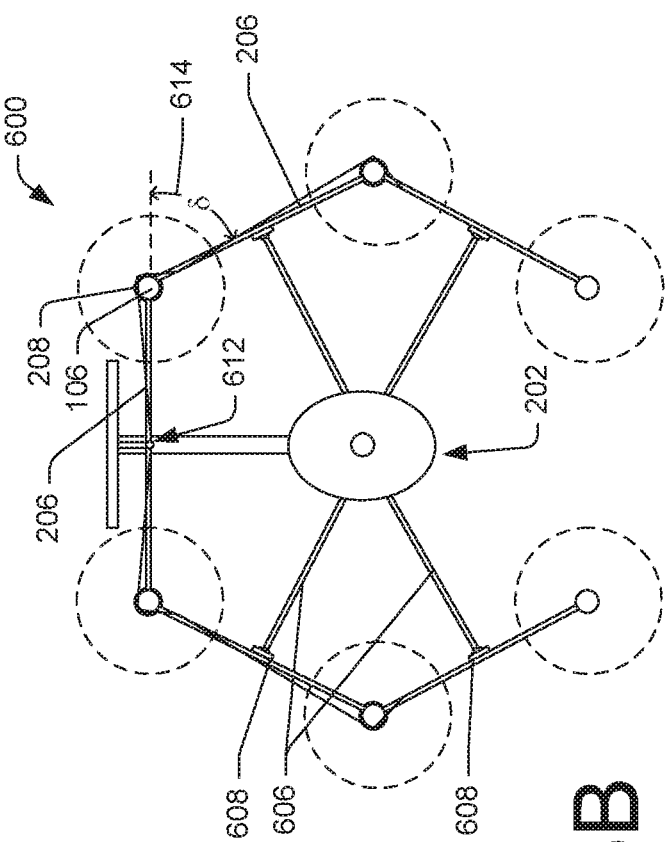

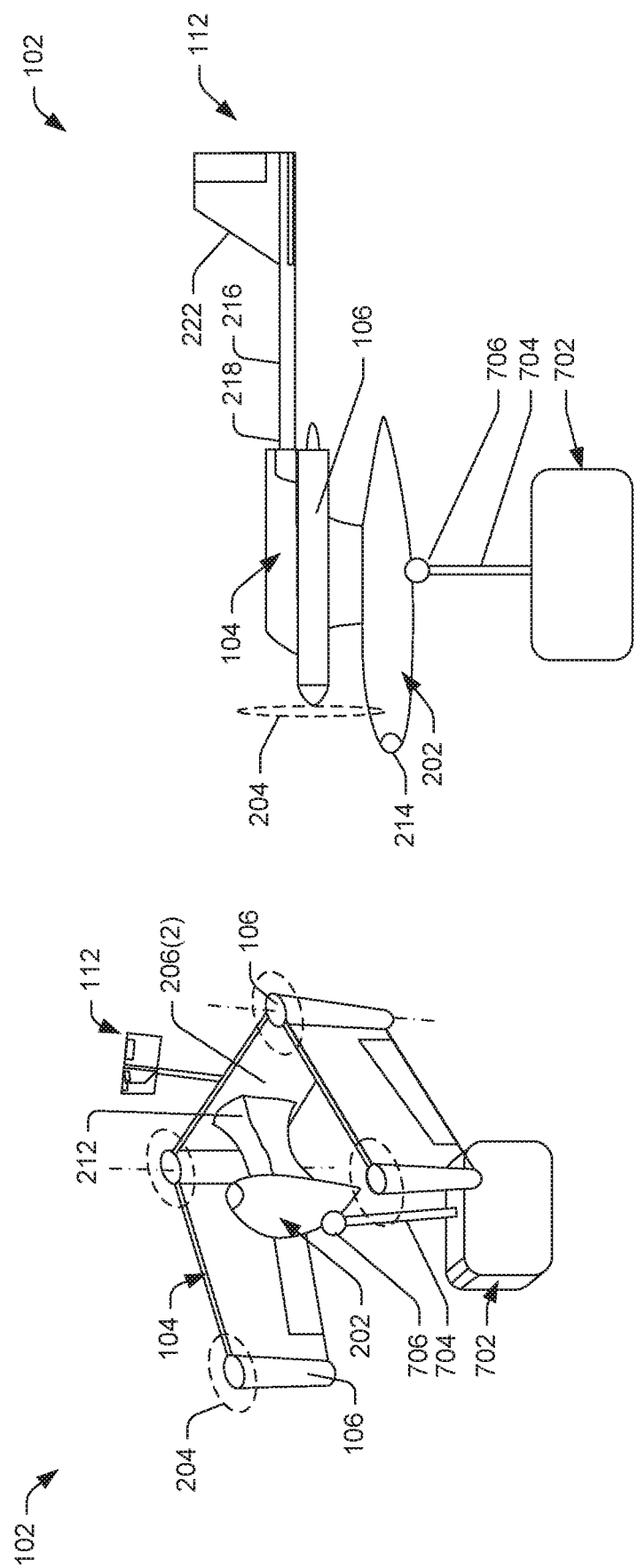

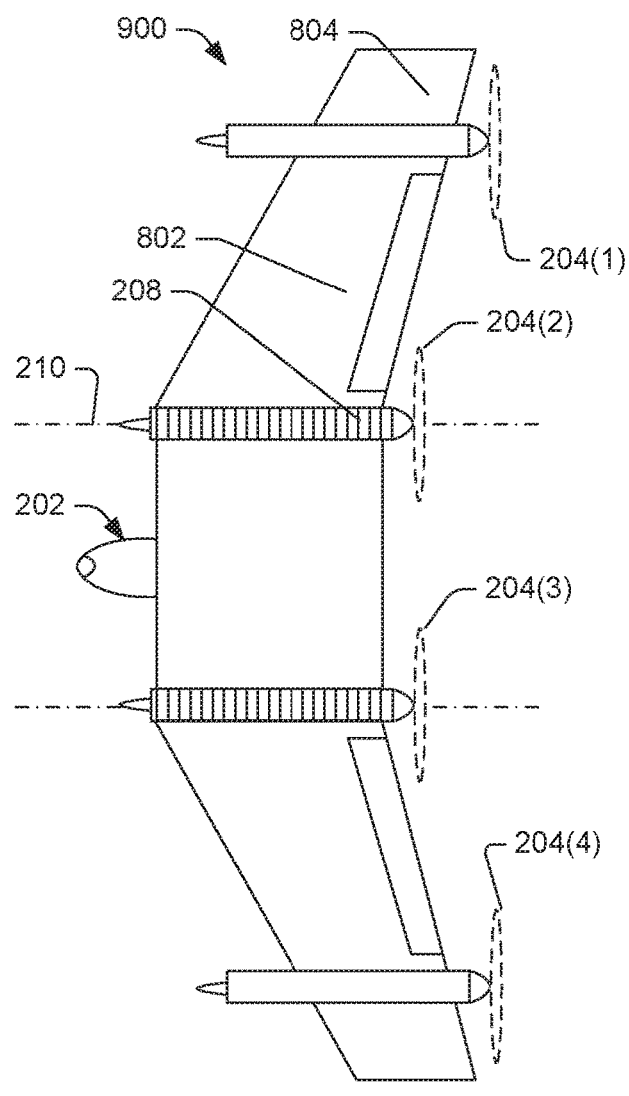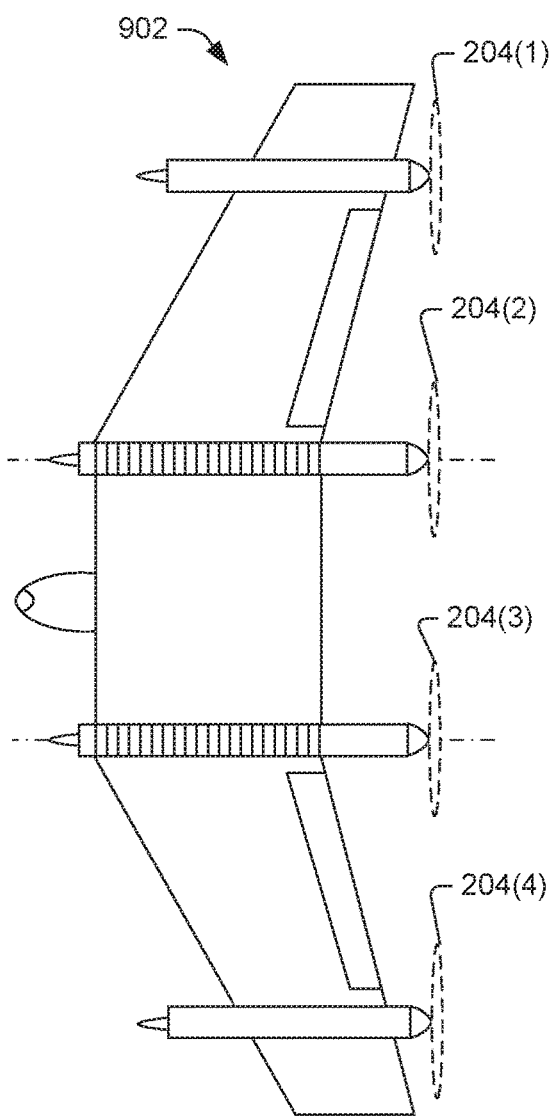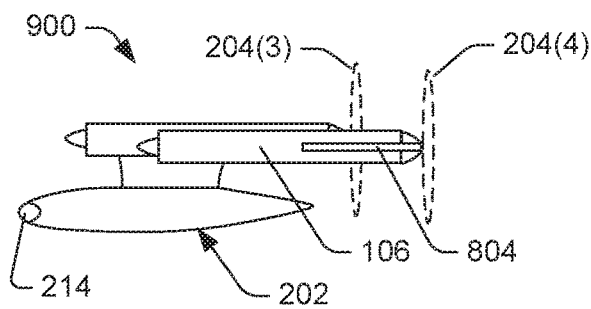
FIG. 9A
FIG. 9C
FIG. 9B

IN-FLIGHT RECONFIGURABLE HYBRID UNMANNED AERIAL VEHICLE

CROSS-REFERENCE TO RELATED APPLICATIONS

This application is a continuation of U.S. patent application Ser. No. 15/390,273, filed Dec. 23, 2016, which is a continuation of U.S. patent application Ser. No. 14/524,956, now U.S. Pat. No. 9,550,567, filed Oct. 27, 2014. The contents of each of these documents are incorporated by reference herein, in their entireties.

BACKGROUND

Automated aerial vehicles, sometimes referred to as drones or unmanned aerial vehicles (UAVs), have become commonly used by hobbyists, some commercial entities, and various government entities. Many of these aerial vehicles are used for image capture, for example, by hobbyists; however, many other uses exist.

Aircraft are often designed for a specific type of flight. Fixed wing aircraft, which primarily rely on a wing for upward lift, typically include a propulsion system that is in fixed orientation and provides thrust in the single direction that, during horizontal flight, is approximately parallel with the horizon. Aircraft that rely on rotors for propulsion, such as helicopters, quadcopters, and other rotorcraft, primarily rely on the rotors for upward lift and typically include a propulsion system that is in fixed orientation and provides thrust in the single direction that, during flight, is approximately perpendicular with the horizon. Some hybrid aircraft rely on both rotors and wings to provide upward lift, depending on a mode of flight. A classic example is the Boeing V-22 Osprey, which uses tilt-rotors that rotate relative to the fuselage to enable transition from a rotor-lift-based mode of flight to a wing-lift-based mode of flight.

Unmanned aerial vehicles offer unique advantages and considerations as compared to their counterpart manned aerial vehicles (e.g., typical helicopters and fixed wing aircraft). For example, unmanned aerial vehicles may be smaller in overall size and lightweight as compared to their counterpart manned aerial vehicles. The size and thrust ratios of propulsion systems for unmanned aerial vehicles allow these aerial vehicles to perform maneuvers that may not be possible or may not be practical for their counterpart manned aerial vehicles.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A is an isometric view of the UAV. FIG. 2B is a side elevation view of the UAV. FIG. 2C is a top view of the UAV.

FIG. 3A is an isometric view of the UAV. FIG. 3B is a side elevation view of the UAV. FIG. 3C is a top view of the UAV.

FIG. 6A is a side elevation view of an UAV, which includes an in-flight reconfigurable wing structure with six rotors, in a horizontal flight configuration.

FIG. 6B is a side elevation view of the UAV shown in FIG. 6A, but shown as a hexarotor in the vertical flight configuration.

FIG. 7A is an isometric view of the UAV shown in FIG. 3A with cargo coupled to the UAV via a swing arm. FIG. 7A, shows the swing arm positioning the cargo underneath the fuselage of the UAV during flight in the vertical flight configuration.

FIG. 7B is a side elevation view of the UAV shown in FIG. 7A. FIG. 7B, shows the swing arm positioning the cargo underneath the fuselage of the UAV during flight in the horizontal flight configuration.

FIG. 8A shows a top view of the UAV while FIG. 8B shows a side view. FIG. 8C shows a top view of another UAV where the rotors are in a same plane.

FIGS. 9A-9C show yet another UAV with a swept wing that includes an in-flight reconfigurable wing structure and rotor blades adjacent to a trailing edge of the wing structure. FIG. 9A shows a top view of the UAV while FIG. 9B shows a side view. FIG. 9C shows a top view of another UAV where the rotors are in a same plane.

DETAILED DESCRIPTION

Figure 1:
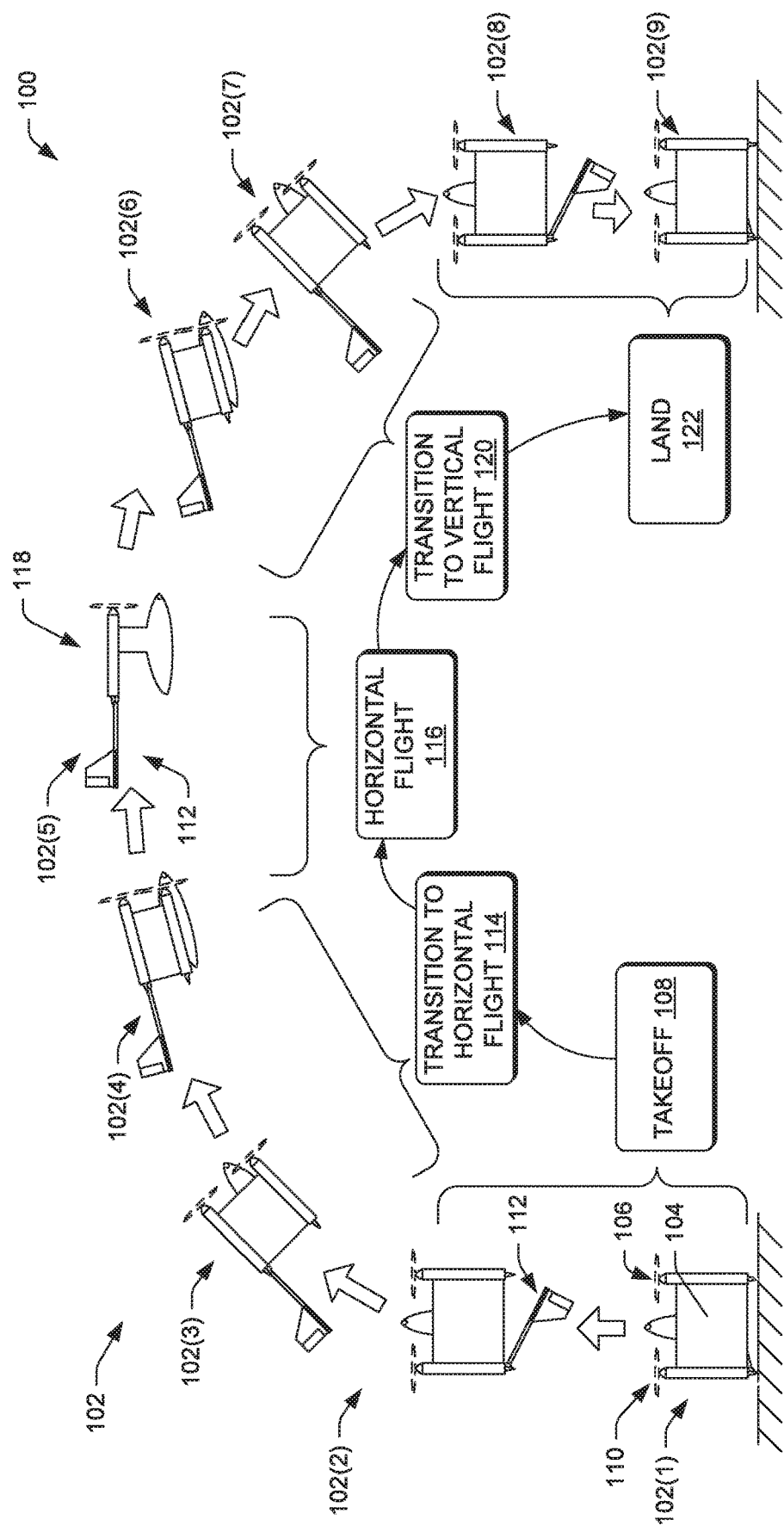
FIG. 1 is a pictorial flow diagram showing an illustrative process of transitioning between a vertical flight configuration and a horizontal flight configuration by an unmanned aerial vehicle (UAV).

This disclosure is directed to an unmanned aerial vehicle ("UAV") and systems, devices, and techniques pertaining to reconfiguring the UAV during flight to transition between vertical flight and horizontal flight. The UAV may include propulsion units, such as rotors driven by an electric motor, which are coupled to a wing like many conventional aircraft. However, unlike conventional aircraft, the wing may includes wing segments rotatably coupled together by pivots that rotate to position the propulsion units around a center of mass of the UAV, typically located within a fuselage, when the UAV's fuselage is oriented perpendicular with the horizon. In this vertical flight configuration, the UAV may operate in a vertical takeoff and landing (VTOL) mode and may perform vertical flight, hover, and/or perform other flight maneuvers.

During vertical flight, the UAV may cause a main wing (including both sides of the wing which are located on opposite sides of a fuselage) to extend outward such that the wing segments become positioned substantially parallel to one another and the wing resembles a conventional fixed wing. With the wing extended, the UAV may assume a horizontal flight configuration. During transition between the vertical flight configuration and the horizontal flight configuration, the UAV may adjust a pitch or attack angle such that the fuselage becomes oriented substantially parallel to the horizon causing the wing to generate upward lift while the UAV travels horizontally in the horizontal flight configuration. In some embodiments, the UAV may be configured to land in the horizontal flight configuration using landing gear. In various embodiments, the UAV may reverse the operations discussed above to return the wing to the vertical flight configuration and land in vertical flight configuration.

In some embodiments, the UAV may include a tail that may include control surfaces, such as vertical stabilizer with a rudder and/or horizontal stabilizers with elevators. In selected embodiments, the tail may be configured to fold (or rotate) toward the fuselage in a stowed position to enable the UAV to land in the vertical flight configuration. In some embodiments, the tail may fold at least ninety degrees at a pivot near the main wing or near the fuselage to reposition the tail and allow for landing in the vertical flight configuration without damaging the tail by contact with the ground.

In various embodiments, the main wing of the UAV may be a swept wing that may perform functions of a conventional tail. The swept wing may extend past the fuselage and include control surfaces such as ailerons and flaps.

The UAV, when flying in the vertical flight configuration, may approach landing and may land with a fore end of the fuselage pointed toward the ground or the sky. In the ground-facing orientation, sensors located in the fore end of the fuselage may be used to guide landing of the UAV. The rotors may be configured for adjustable pitch from a positive pitch to a negative pitch, thereby reversing a direction of thrust generated by the rotors (i.e., switching between push and pull). During the transition between the vertical flight mode and the horizontal flight mode, the pitch of the rotors may be adjusted to reverse the thrust before, during, or after the wing is folded/unfolded. Ultimately, the UAV may assume horizontal flight where the fore end of the fuselage is pointed in the direction of travel of the UAV allowing use of the sensors to navigate, detect obstacles, and perform other functions.

In various embodiments, the UAV may be configured to transport a payload (i.e., cargo), from an origination location, such as a fulfillment center, to a destination, such as a delivery destination. The payload may be contained within the fuselage. In some embodiments, at least some of the payload may be coupled to the fuselage or the main wing by a swing arm. The swing arm may rotate as the UAV transitions from vertical flight in the vertical flight configuration to horizontal flight in the horizontal flight configuration. By rotating, the swing arm may position the payload underneath the fuselage of the UAV, which may result in stable or balanced flight of the UAV and stable transitions between the flight configurations.

The apparatuses, techniques, and systems described herein may be implemented in a number of ways. Example implementations are provided below with reference to the following figures.

FIG. 1 is a pictorial flow diagram showing an illustrative process 100 of transitioning between a vertical flight configuration and a horizontal flight configuration by an unmanned aerial vehicle (UAV) 102. The UAV 102 includes a wing 104 having wing segments that pivot at or near propulsion units 106 (e.g. rotor units). The wing segments may enable adjusting the relative location of the propulsion units 106 to reconfigure the UAV 102 during flight between a configuration as a rotor craft (i.e. vertical flight, hover) to flight as a fixed wing aircraft (i.e., horizontal flight with upward lift from the wing). In FIG. 1, illustrations of the UAV 102(1)-(9) show transition of the UAV 102 from takeoff (i.e., the UAV 102(1)) to landing (i.e., the UAV 102(9)), and showing various stages of flight in-between the takeoff and landing.

At 108, the UAV 102(1) initiates takeoff while in a vertical flight configuration 110 where a fuselage of the UAV 102 is oriented perpendicular to the horizon. In a vertical flight configuration 110, the UAV(1) 102 may locate wing segments of the wing 104 to position the propulsion units 106 around a center of mass of the UAV 102, which may be located within the fuselage of the UAV 102. In the vertical flight configuration 110, a tail 112 of the UAV 102(1) may be folded upward toward a front of the fuselage and located in a stowed position. As the UAV 102 begins to rise above the ground in vertical flight, as shown by the UAV 102(2), the tail 112 may begin to rotate outward from the stowed position toward an extended position configured to provide lift and control during horizontal flight, such as shown by the UAV 102(5).

At 114, the UAV 102(3) may begin transition to horizontal flight from vertical flight. To perform the transition, the UAV 102(3) may continue to extend the tail 112 outward to the extended position. The UAV 102(3) may begin to straighten the wing 104 such that the wing segments located between the propulsion units 106 transition from a non-parallel orientation to a substantially parallel orientation with respect to the other wing segments (shown by the UAV 102(5)). Thus, the wing 104 may assume a configuration that resembles a main wing on a conventional fixed-wing aircraft. The UAV 102(4) shows the wing 104 just prior to being fully outstretched, and thus just prior to the UAV 104(4) completing the transition to horizontal flight. As the UAV 102(4) transitions to horizontal flight, an attack angle of the UAV 102(4) shifts to position the fuselage closer to parallel to the horizon as shown by the UAV 102(4). Thus, the fuselage of the UAV 102 rotates ninety degrees through the transition from the vertical flight to the horizontal flight. During the transition, the propulsion units provide the majority of the upward lift to support flight of the UAV 102(3). However, the UAV 102(4) benefits from some lift generated by at least a portion of the wing 104.

At 116, the UAV 102(5) performs horizontal flight while in a horizontal flight configuration 118 where a fuselage of the UAV 102(5) is oriented substantially parallel to the horizon. In a horizontal flight configuration 118, the UAV 102(5) may generate upward lift from the wing 104 while utilizing the propulsion units 106 to generate horizontal thrust. In the horizontal flight configuration 118, the tail 112 may be located in the extended position configured to provide lift and control during horizontal flight. By performing horizontal flight in the horizontal flight configuration 118, the UAV 102(5) may at least conserve energy and travel at greater speeds than when flying in the vertical flight configuration 110.

At 120, the UAV 102(6) may begin a transition from horizontal flight in the horizontal flight configuration 118 to vertical flight in the vertical flight configuration 110. In some embodiments, the UAV 102(6) may initiate an upward angle of attack such that the tail 112 moves below the fuselage of the UAV 102(6). The UAV 102(7) may rotate the wing segments of the wing 104 about the pivots to cause the wing to fold inwards and move toward a location that positions the propulsion units 106 around the center of mass of the UAV 102(7). During the transition, the UAV 102(7) may lose upward lift generated by the wing 104 and begin to rely on vertical thrust from the propulsion units 106 to support flight of the UAV 102(7).

At 122, the UAV 102(8) may stow the tail 112 in the stowed position and may assume flight by reliance on the propulsion units 106 providing vertical thrust to support flight of the UAV 102(8). The UAV 102(9) may land on landing features while the tail is stowed in the stowed position and the wing segments position the propulsion units 106 around the center of mass of the UAV 102(9).

Figure 2A:
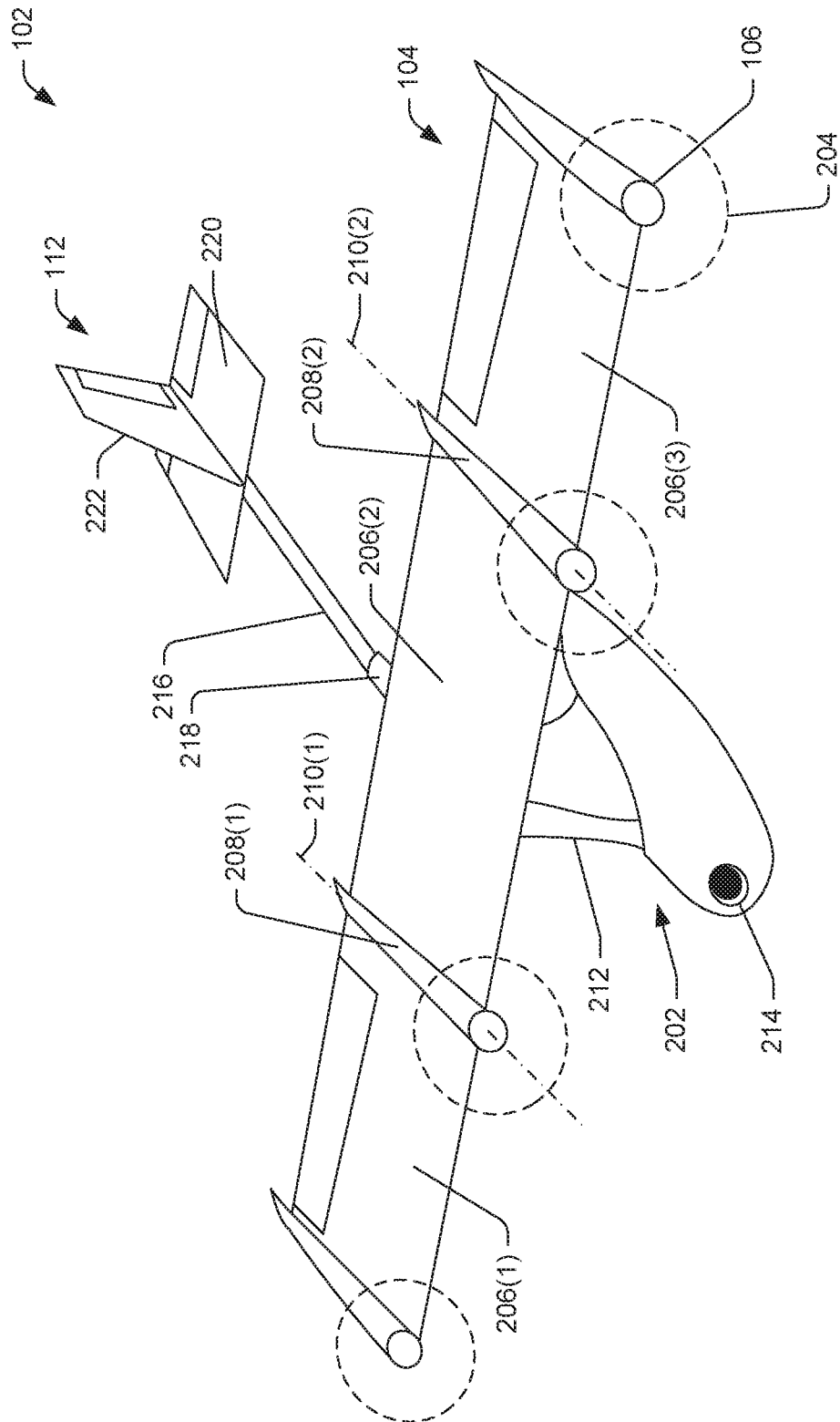
FIGS. 2A-2C show an UAV, which includes an in-flight reconfigurable wing structure, in a horizontal flight configuration.

FIG. 2A is an isometric view of the UAV 102 shown in the horizontal flight configuration 118, and thus represented as the UAV 102(5) discussed above with reference to FIG. 1. As shown in FIG. 2A, the UAV 102 includes four propulsion units 106 coupled to the wing 104. However, the UAV 102 may include more or fewer propulsion units 104. At least some of the propulsion units 104 may be coupled to the UAV 102 somewhere other than the wing 104, such as on a fuselage 202 of the UAV 102. The propulsion units 106 may be implemented using rotors, jet engines, turbo fans, and/or other types of thrust generating mechanisms.

The propulsion units may be powered by electricity (e.g., battery power), combustion of material (e.g., gas, solid fuel), and/or chemical reaction, which may be used separately or in combination. When the propulsion units 106 include rotors 204 (as shown in FIG. 2A), the rotors may be rotated by electric motors. The rotors 204 may include fixed or variable pitch rotor blades. Variable pitch blades enable adjustment of the pitch of the rotor blades to increase or decrease an amount of air moved by the rotor blades (and thus the resultant thrust) during a rotation of the rotor. The variable pitch may also be configured to allow transition between a positive pitch and a negative pitch, which may reverse a direction of resultant thrust caused by rotation of the rotor.

The wing 104 may include various wing segments 206 that span at least partly between the propulsion units 104 and position the propulsion units 104 in different locations based on different configurations assumed by the wing segments 206. The wing segments 206 may include a first wing segment 206(1), a second wing segment 206(2), and a third wing segment 206(3) when the UAV 102 includes four propulsion units 106. However, the wing 104 may include more or fewer of the wing segments 206 in some embodiments. Each of the wing segments 206 may rotatably couple to another one of the wing segments 206 via pivots 208 that cause rotation about a respective axis 210. As shown in FIG. 2A, the UAV 102 may include a first pivot 208(1) that rotatably couples the first wing segment 206(1) to the second wing segment 206(2) to enable rotation about a first axis 210(1). Similarly, a second pivot 208(2) may rotatably couple the second wing segment 206(2) to the third wing segment 206(3) to enable rotation about a second axis 210(2). The second wing segment 206(2) may be fixed with respect to fuselage 202 by a fuselage support structure 212. In some embodiments, each of the pivots 208 may be located adjacent to one of the propulsion units 104. However, the pivots may also be collinear to respective propulsion units such as when the propulsion unit in included within a hinge configuration that forms the pivot. For example, the propulsion unit may act like a pin within a hinge configuration that enables rotation of the hinge configuration.

The UAV 102 may include various sensors to monitor various aspects of control of the UAV. The sensors may include many of the same sensors used on conventional aircraft, drones, or unmanned aerial vehicles (UAVs). At least one sensor 214 may be located proximate to a fore end of the fuselage. The sensor 214 may include an image sensor to provide visual information to assist flight of the UAV.

The tail 112 and the wing 104 may include control surfaces, such as flaps, ailerons, and/or stabilizers to stabilize and enable control of the UAV 102 during flight in the horizontal flight configuration where the UAV 102 relies on upward lift generated by the wing 104. The tail 112 may include one or more tail booms 216 that secure the tail 112 to the wing 104 and/or to the fuselage 202 via a rotatable tail pivot 218. The rotatable tail pivot 218 enables rotation of the tail with respect to the wing 104. Using the rotatable tail pivot, the tail may be rotated from/to a stowed position after takeoff and just prior to landing, respectively, as discussed above with reference to the process 100. The tail 112 may include a horizontal stabilizer 220 and a vertical stabilizer 222.

The UAV 102 has a center of mass that may be located within the fuselage 202 or proximate to the fuselage 202. In some embodiments, the UAV 102 may be configured to carry a payload, which may be carried within the fuselage 202 or may be coupled to the fuselage 202. For example, the payload may be coupled to the fuselage 202 or the wing 104 via a swing arm, which is discussed in further detail below. The addition of the payload may modify a location of the center of mass of the UAV 102.

Figure 2B:
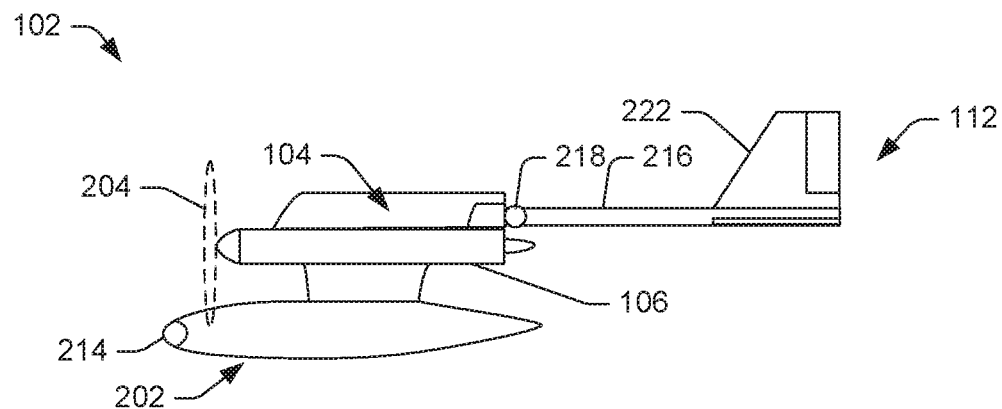
Figure 2C:
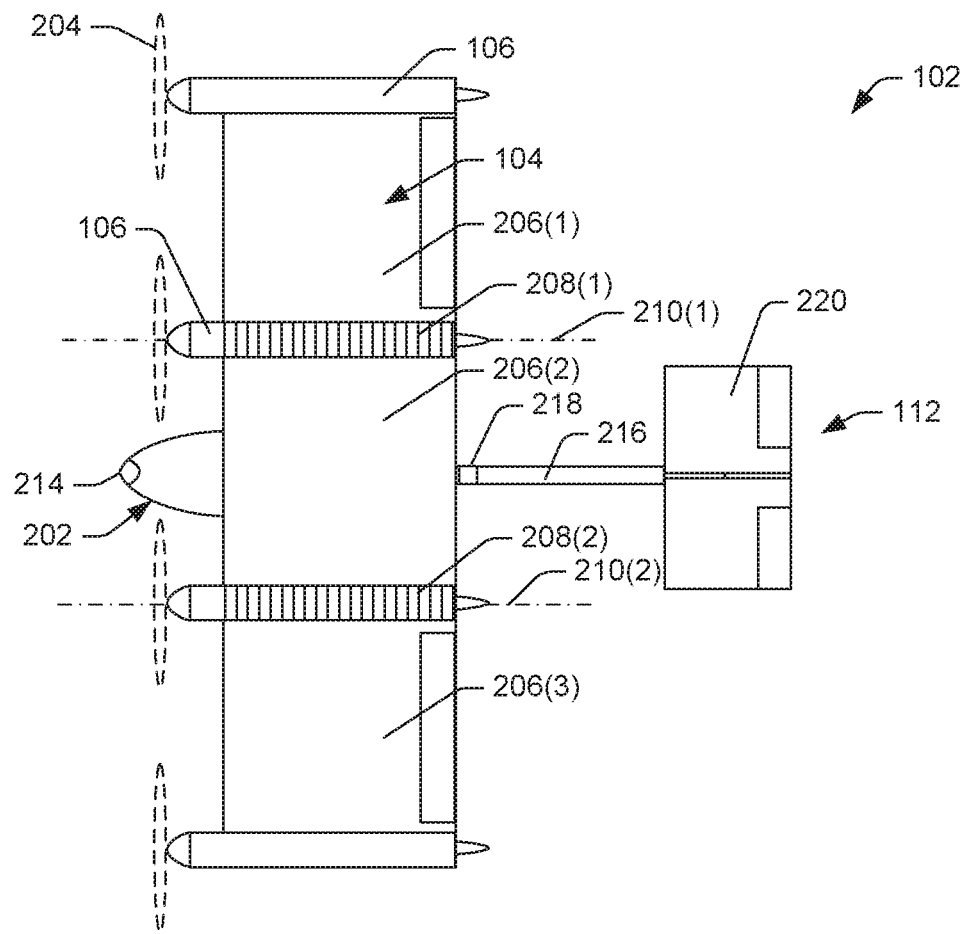

FIG. 2B is a side elevation view of the UAV shown in the horizontal flight configuration 118. FIG. 2C is a top view of the UAV shown in the horizontal flight configuration 118.

Figure 3A:
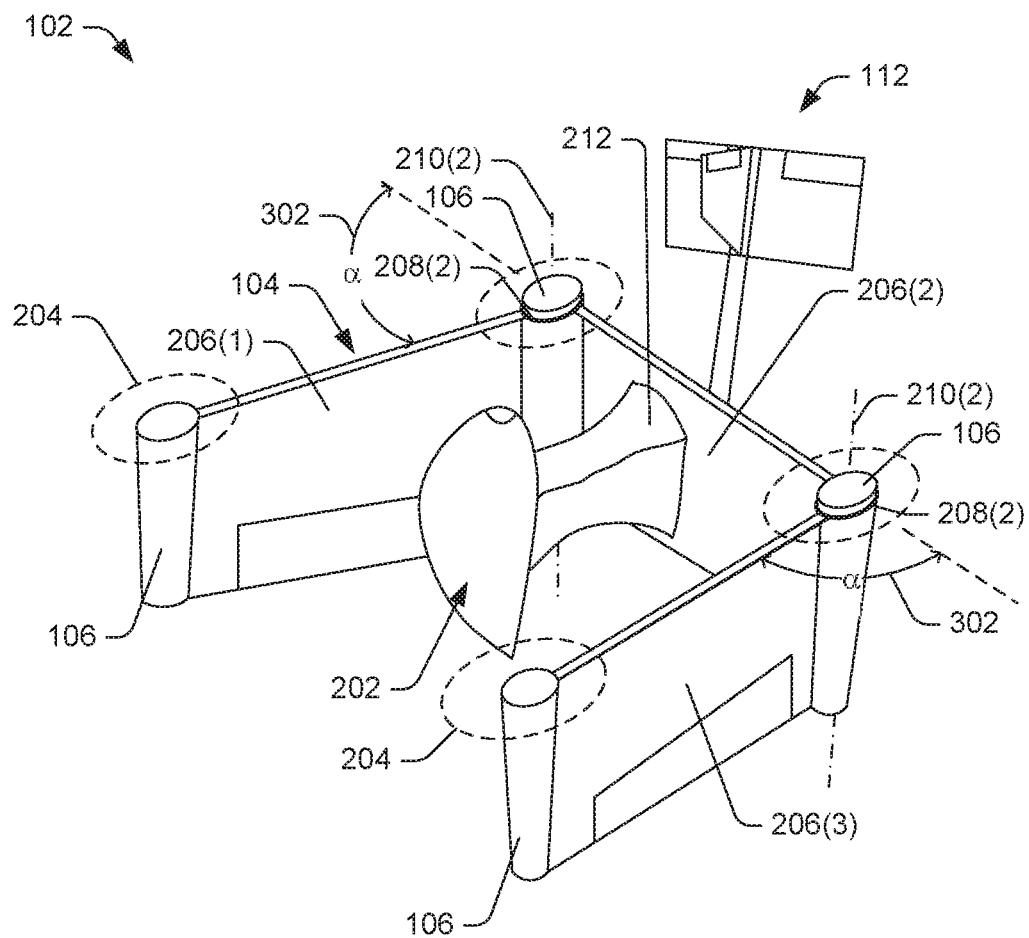
FIGS. 3A-3C show the UAV from FIG. 2A in a vertical flight configuration.

FIG. 3A is an isometric view of the UAV 102 shown in the vertical flight configuration 110, and thus represented as, for example, the UAV 102(8) discussed above with reference to FIG. 1. As shown in FIG. 3A, the orientation of the fuselage 202 is perpendicular to the horizon and approximately ninety degrees different than the orientation of the fuselage 202 shown in FIG. 2A, which is shown as being parallel to the horizon in FIG. 2A. As discussed above, the UAV 102 may rotate the wing segments 206 relative to an axis to position the propulsion units 106 around a center of mass of the UAV 102. The center of mass may be located within the fuselage or proximate to the fuselage 202, such as when a payload (or cargo) is coupled to the fuselage 202. To transition from the horizontal flight configuration 118 shown in FIG. 2A to the vertical flight configuration 110 shown in FIG. 3A, pivot drive mechanisms may cause the wing segments 206 to rotate approximately an angle $\alpha$ 302, via the pivots 208, about respective axes 210. The pivot drive mechanisms may include at least one of servos, linear actuators, electric motors, cable pulleys, and/or other mechanisms to cause rotation of a first wing segment relative to a second, adjacent wing segment. The pivot drive mechanism may be coupled to the pivot, to the adjacent wing sections near the pivot, or both the pivot and the adjacent wing sections. In some embodiments, biasing devices (e.g., coil springs, leaf springs, etc.) may cause the wing segment to assume a first configuration (e.g., the horizontal flight configuration or the vertical flight configuration) while the pivot drive mechanisms may cause the wings to transition to a second, different configuration (e.g., the vertical flight configuration or the horizontal flight configuration). Locking devices and/or friction devices may be used to maintain a current configuration during flight (e.g., mechanical lock, magnetic lock, electronic lock, etc.). The locking mechanisms may be included in the pivots, the pivot drive mechanisms, or in other structures as discussed herein. These devices may be used to stiffen and/or stabilize components. In some embodiments, the pivot drive mechanisms may lock the wings in a configuration.

Figure 3B:
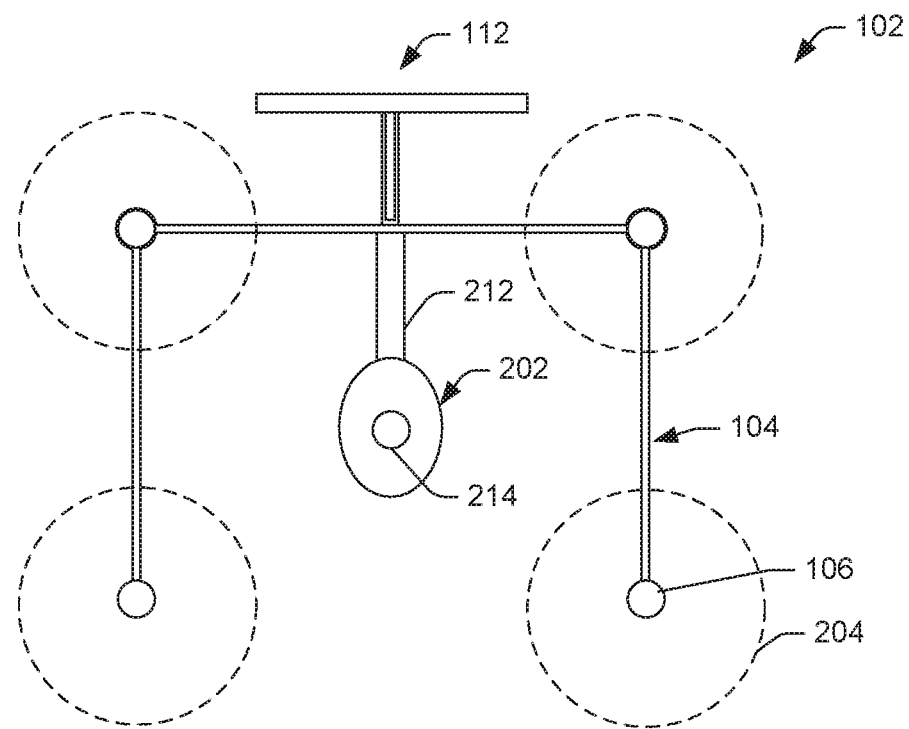

FIG. 3B is a side elevation view of the UAV 102 shown in the vertical flight configuration 110. The side elevation view of FIG. 3B is defined with respect to the view shown in FIG. 2A. However, when the UAV 102 is in flight in the vertical flight configuration 110, the view shown in FIG. 3B appears as a top view.

Figure 3C:
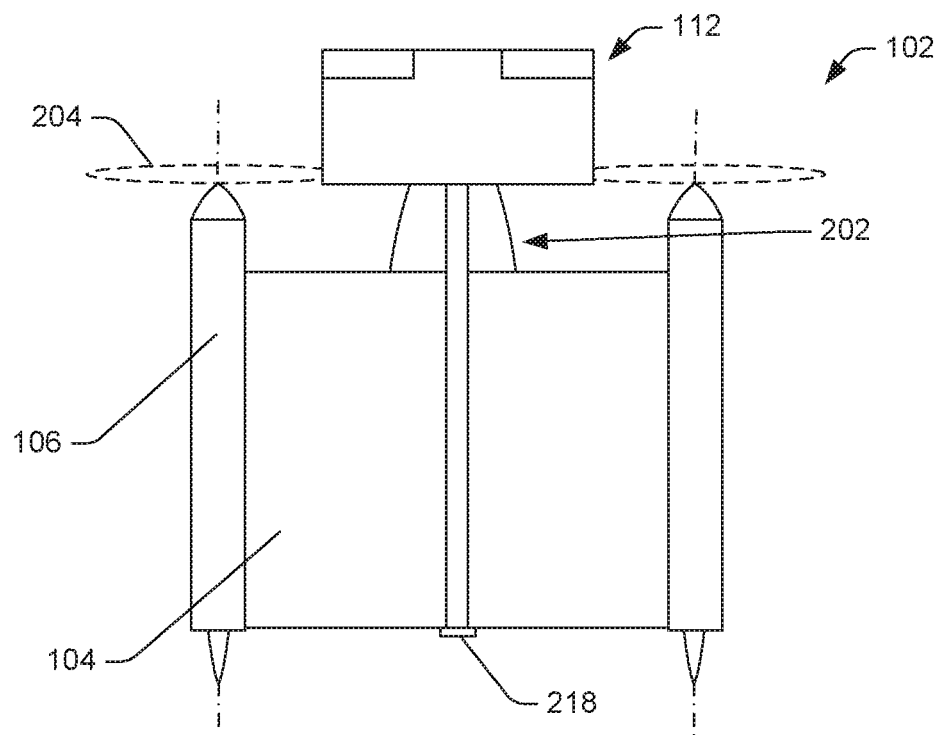

FIG. 3C is a top view of the UAV 102 shown in the vertical flight configuration 110. The top view of FIG. 3C is defined with respect to the view shown in FIG. 2A. However, when the UAV 102 is in flight in the vertical flight configuration 110, the view shown in FIG. 3C appears as a side elevation view.

The above discussion of the UAV 102 provides a general description of embodiments of the UAV 102 and various configurations. The following discussion and associated figures include various embodiments and/or versions of the UAV 102 or other UAVs that rely on the principles discussed above. Embodiments and features of the UAV discussed herein may be combined with other embodiments and/or other features of the UAV discussed herein to create a version of the UAV possibly not explicitly shown in the figures, but disclosed herein nonetheless.

Figure 4A:
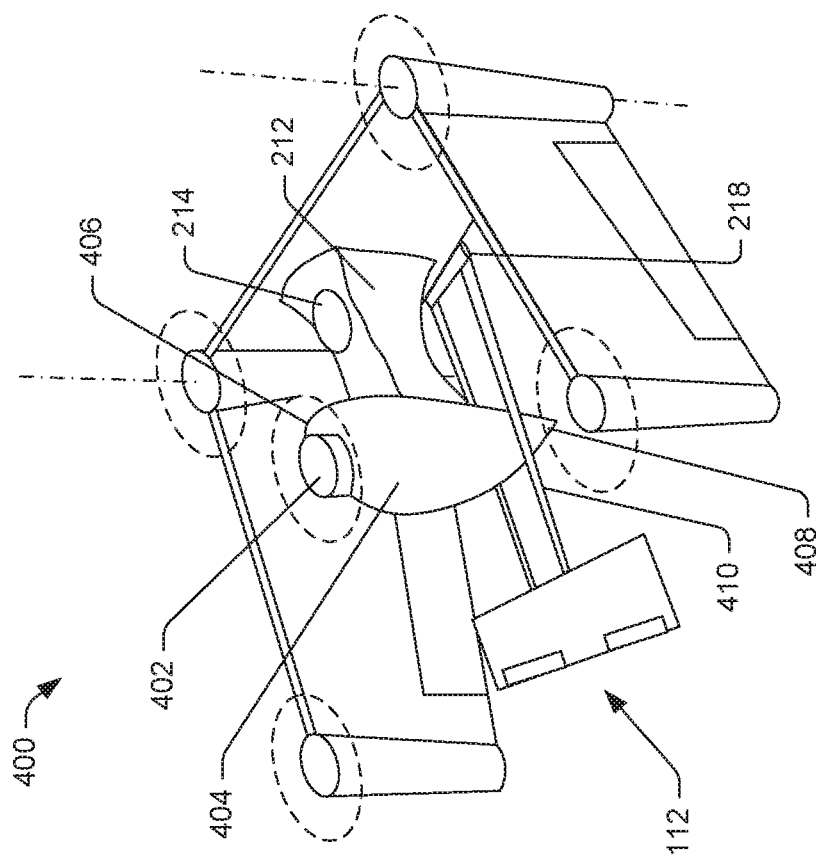
FIG. 4A is an isometric view of an UAV that includes a propulsion unit coupled to the fuselage.

FIG. 4A is an isometric view of an UAV 400. The UAV 400 is shown in the vertical flight configuration 110 and is similar or the same as the UAV 102 shown in FIG. 3A except possibly as described below in this section.

The UAV 400 includes at least one propulsion unit 402 coupled to a fuselage 404. The propulsion unit 402 may be a rotor unit that includes a rotor similar to or the same as the rotor 204 discussed above. While the propulsion unit 402 is shown proximate to a fore end 406 of the fuselage 404, the propulsion unit 402 may be coupled proximate to an aft end 408 of the fuselage 404 or multiple propulsion units may be coupled to the fuselage 404 proximate to the fore end 406, the aft end 408, or both. The sensor 214 may be located on the fuselage support structure 212 to accommodate the propulsion unit 402 being coupled to the fuselage 402.

The UAV 400 includes the tail 112. The tail may be configured to pivot inwards toward the aft end 408 of the fuselage 404. To cause the tail boom 216 to avoid interfering with or contact with the fuselage 404, the rotatable tail pivot 218 may be rotated about an axis that is not parallel with the wing 104 or the tail boom 216 may include multiple booms with a gap there between to avoid interference with or contact with the fuselage when the tail boom(s) are folded in the stowed position as shown in FIG. 4A.

Figure 4B:
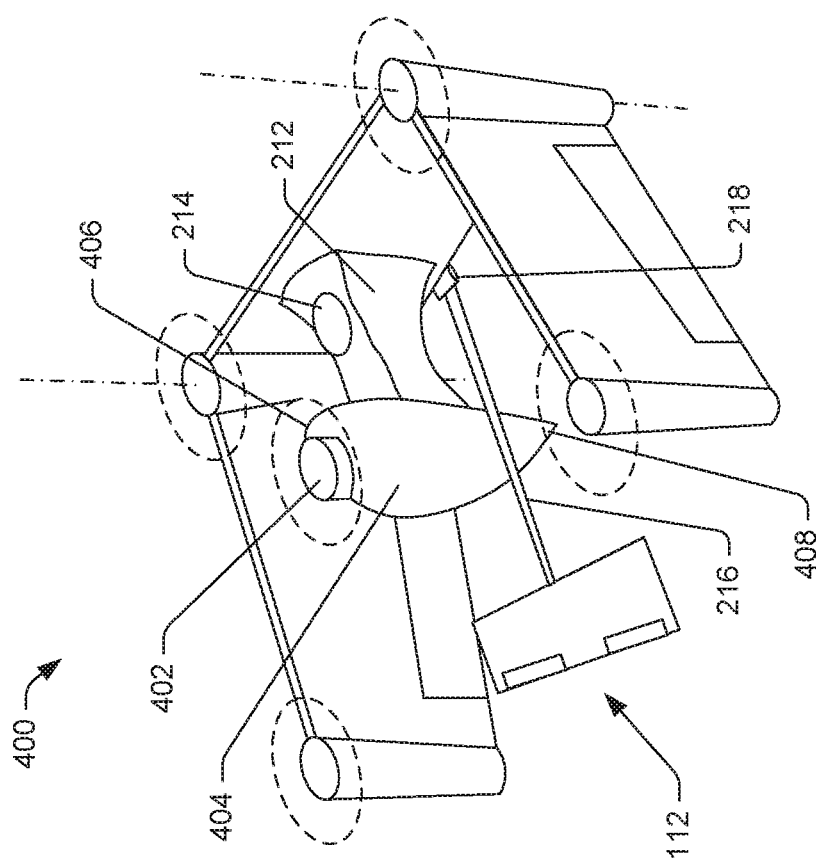
FIG. 4B is an isometric view of an UAV that includes a propulsion unit coupled to the fuselage and a tail coupled to the fuselage with two booms.

FIG. 4B is an isometric view of the UAV 400, but including a tail coupled to the fuselage with two tail booms 410. The two tail booms 410 may include a gap between the booms to accommodate the fuselage 202, and thus to avoid interference with or contact with the fuselage 202 when the tail booms are folded in the stowed position as shown in FIG. 4B.

Figure 5:
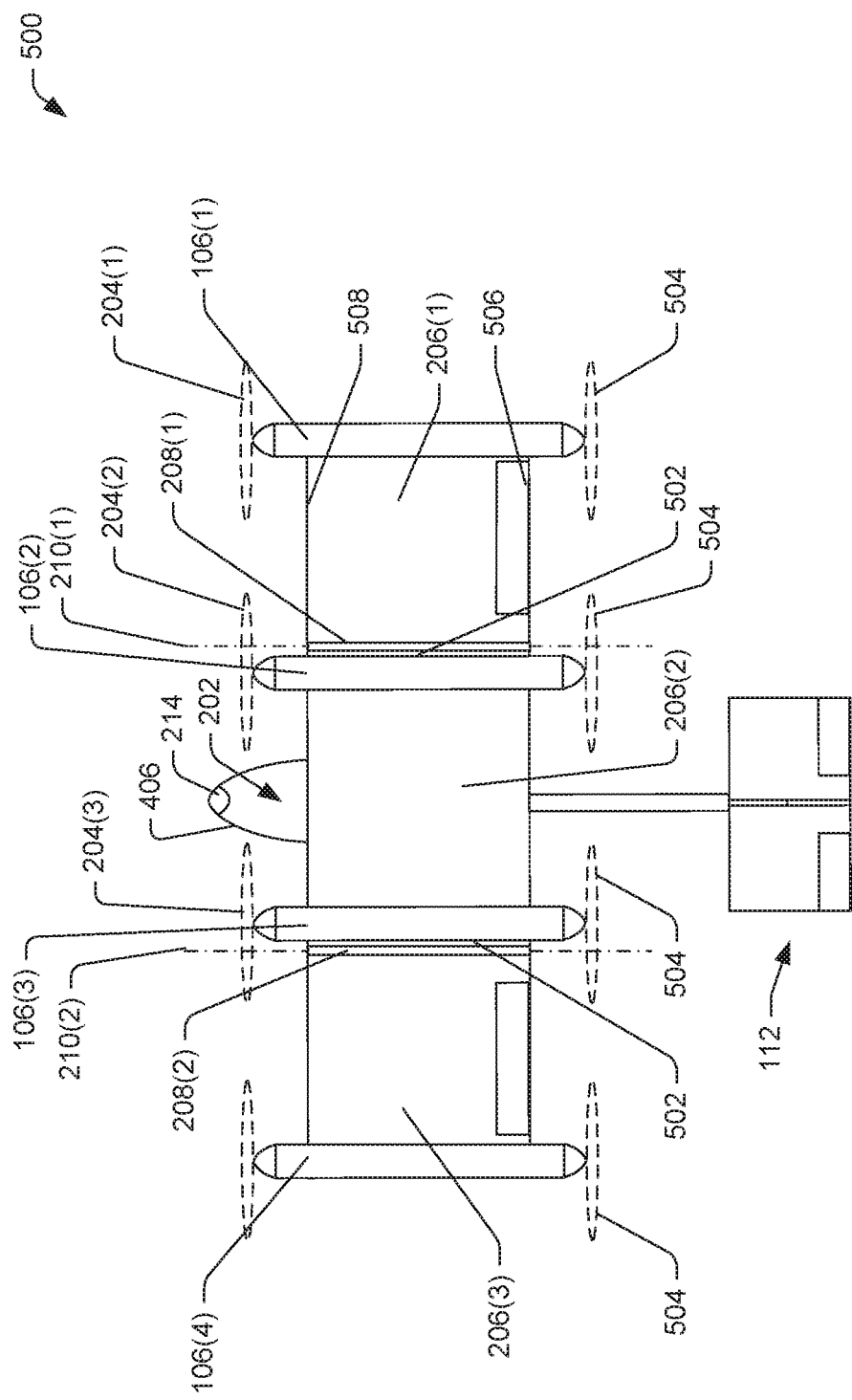
FIG. 5 is a top view of an UAV that includes pivots located adjacent to rotor units.

FIG. 5 is a top view of an UAV 500. The UAV 500 is shown in the horizontal flight configuration 118 and is similar or the same as the UAV 102 shown in FIG. 2C except possibly as described below in this section.

The UAV 500 may include the pivots 208 that cause the wing segments 206 to rotate about respective axes 210. The pivots 208 may be located adjacent to at least one of the propulsion units 106. For example, the wing segment 206(2) may include two propulsion units 106(2) and 106(3) within the wing segment 206(2). The wing segment 206(2) may include a wing portion 502 on either side of the propulsion units 106(2) and 106(3), which extend outward (from the perspective of the fuselage support structure 212) and couple to the pivots 208. Thus, a rotational axis of the rotor 204(3) is different than the rotational axis of the pivot 208(1). In some embodiments, the one of the pivots 208 may be located between the propulsion unit 106(2) and the fuselage support structure 212 while the other one of the pivots 208 may be located between the propulsion unit 106(3) and the fuselage support structure 212. In these embodiments, the wing segment 206(1) may couple the propulsion units 106(1) and 106(2) while the wing segment 206(3) may couple the propulsion units 106(3) and 106(4).

The UAV 500 may include rotors 504 located proximate to a trailing edge 506 of the wing 104 in addition to or instead of the rotors 204 located proximate to a leading edge 508 of the wing 104. Use of the rotors 504 may enable landing in a position to orient the fore end 406 of the fuselage toward the ground, such as toward a landing zone, thereby enabling use of the sensor 214 located on the fore end of the fuselage 202.

FIG. 6A is a side elevation view of an UAV 600. The UAV 600 is shown in the horizontal flight configuration 118 and is similar or the same as the UAV 102 shown in FIG. 3A except possibly as described below in this section.

The UAV 600 may include six propulsion units 602 (or possibly more propulsion units). In some embodiments, the UAV 600 may be configured such that the wing 104, when in the horizontal flight configuration 118, maintains a small angle $\beta$ 604 between the various wing segments 206. However, the wing 104 may still orient the wing segments substantially parallel to one another where the adjacent wing surfaces include a deviation of the small angle $\beta$ 604 of plus/minus five degrees from parallel when in the horizontal flight configuration. The wing, when in the horizontal flight configuration, may be fixed or locked in place to maintain a consistent angle between adjacent wing segments.

In some embodiments, the fuselage 202 of the UAV 600 may include wing support arms 606 that extend outward from the fuselage 202 and are used to support the wings when the UAV 600 is in the vertical flight configuration 110, shown in FIG. 6B. The support arms 606 may couple to respective wing coupling features 608 to at least partially restrict movement of the wings, as discussed below. Other locking mechanisms may be employed in the pivots and/or in other locations to maintain a configuration of the wing 104 and/or stiffen the wing 104 while the UAV 600 is in the horizontal flight configuration 118 and/or the vertical flight configuration 110. As discussed above, this feature, and all others discussed herein may be employed in some embodiments on the UAV 102 discussed above.

In accordance with some embodiments, the support arms 606 may be coupled to the coupling features 608 by winding a cable 610. For example, the cable 610 may be fixed at one end (e.g., at the coupling features 608) and wrapped around a spool on a second end (e.g., at the support arms 606). Rotation of the spool may cause the cable 610 to be wound, and be taken in, thereby causing the wings to fold toward the fuselage 202 as shown in FIG. 6B.

In various embodiments, a stiffening cable assembly 612 may be configured within the wing 104. The stiffening cable assembly 612 may be configured to stiffen the wing 104 in the horizontal position when the stiffening cable assembly 612 is in tension. The stiffening cable assembly 612 may include a spool that winds the cable to cause the cable to be in tension, and thus cause the stiffening of the wing 104. The stiffening cable assembly 612 may be used to cause the wings to fold away the fuselage 202 as shown in FIG. 6A. The support arms 606, coupling features 608, and/or the stiffening cable assembly 612 may be included in any of the embodiments disclosed herein, and are not limited to the UAV 600.

FIG. 6B shows a side elevation view of the UAV 600 shown in FIG. 6A, but shown as a substantially symmetrical parallelogram (e.g., a hexarotor as a hexagon) in the vertical flight configuration 110. The side elevation view of FIG. 6B is defined with respect to the view shown in FIG. 6A. However, when in flight in the vertical flight configuration 110, the view shown in FIG. 3B appears as a top view. To transition from the horizontal flight configuration 118 shown in FIG. 6A to the vertical flight configuration 110 shown in FIG. 6B, pivot drive mechanisms may cause the wing segments to rotate an angle γ 614, via the pivots, about respective axes. In some embodiments, the wing segments may flex to cause the shape shown in FIG. 6B, which may or may not include use of the pivots. Thus, the wing may flex and enable bending without deformation to translate between the horizontal flight configuration 118 shown in FIG. 6A and the vertical flight configuration 110 shown in FIG. 6B.

As shown in FIG. 6B, the support arms 606 may be coupled to corresponding ones of the wing coupling features 608 to at least partially secure the wing segments 206 in the vertical flight configuration 110. The coupling may be performed by a mechanical coupling, an electrical coupling, and/or a magnetic coupling.

FIG. 7A is an isometric view of the UAV 102 shown in FIG. 3A with cargo 702 coupled to the UAV 102 via a swing arm 704. FIG. 7A, shows the swing arm 704 positioning the cargo 702 underneath the fuselage 202 of the UAV 102 during flight in the vertical flight configuration 110. As discussed herein, the cargo 702 includes items for delivery or transport by the UAV 102 including a container or container(s) used to transport such items. The term "cargo" 702 is used interchangeable herein with the term "payload." In some embodiments, the cargo 702 may be formed as a lifting body, which may generate lift while the UAV is in horizontal flight. The cargo 702 may be formed of an aerodynamic shape/profile to reduce drag while still having large or maximized space for transport of items.

The swing arm 704 may be rotatably coupled to a swing arm pivot 706 that allows the swing arm to rotate about an axis associated with the swing arm pivot 706. By allowing the swing arm to rotate, the center of mass of the UAV 102 when coupled to the cargo 702 may be positioned near or below the center of mass of the UAV 102 (when the cargo 702 is not coupled to the UAV 102). More specifically, as shown in FIG. 7A, the center of mass of the UAV 102 with the cargo 702 may be approximately equidistant from each of the rotors 204, thereby sharing the load of the cargo 702 between each rotor.

FIG. 7B is a side elevation view of the UAV 102 shown in FIG. 7A. FIG. 7B, shows the swing arm positioning the cargo underneath the fuselage 202 of the UAV during flight in the horizontal flight configuration 118.

Figure 8A:
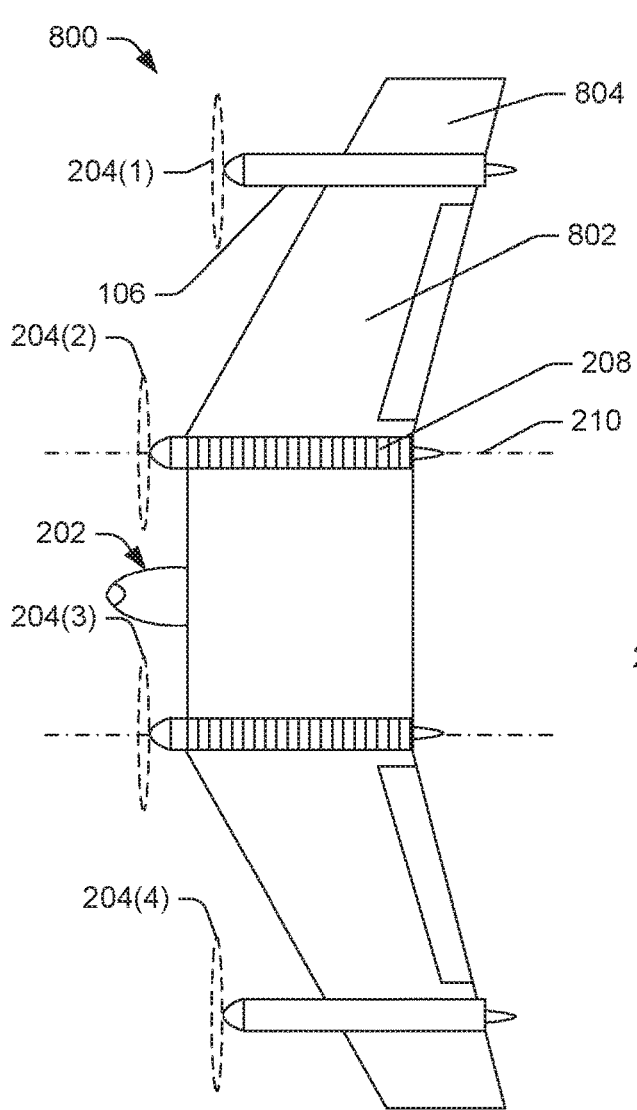
FIGS. 8A-8C show an UAV with a swept wing that includes an in-flight reconfigurable wing structure.

FIG. 8A shows a top view of an UAV 800 shown in the horizontal flight configuration 118 and is similar or the same as the UAV 102 shown in FIG. 3A except possibly as described below in this section.

Figure 8B:
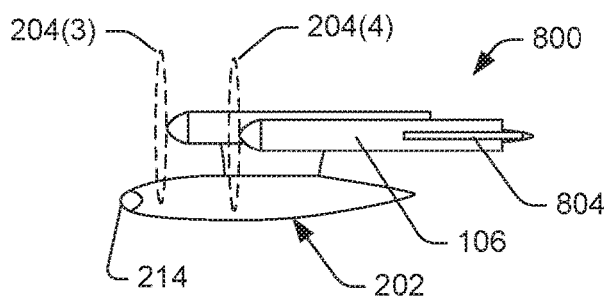
Figure 8C:
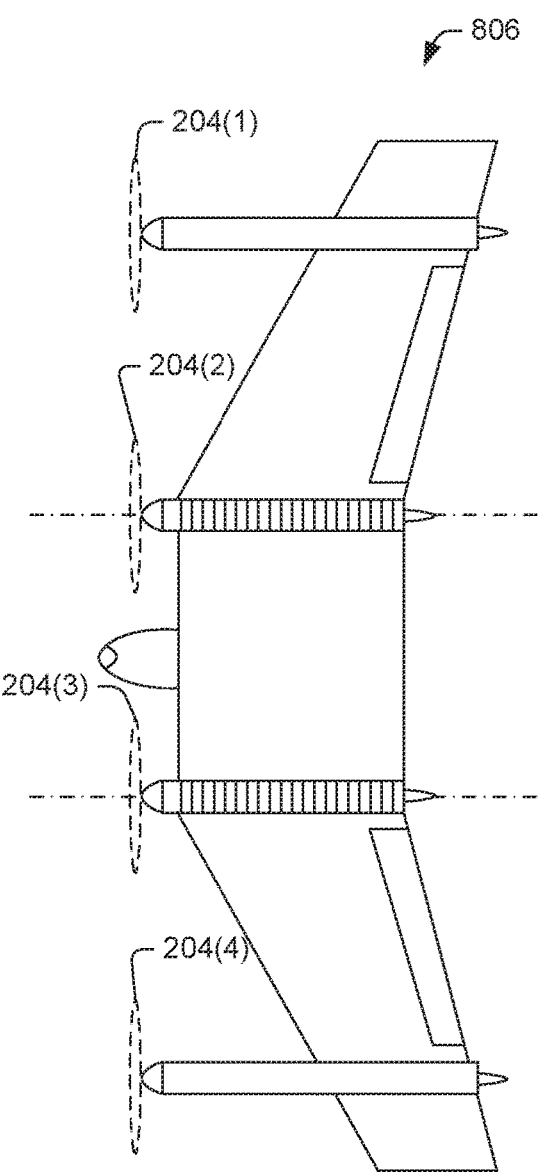

The UAV 800 includes a swept wing 802 that is configurable to transition between the horizontal flight configuration 118 (shown in FIG. 8A) and a vertical flight configuration. The swept wing 802 may include rotors proximate to a leading edge of the swept wing 802 and control surfaces on a trailing edge of the swept wing 802 to enable the UAV 800 to maintain horizontal flight using lift generated by the swept wing 802. The UAV 800 may include a wing tip 804 that extends outward (from a prospective of the fuselage 202) past the propulsion units. FIG. 8B shows a side view of the UAV 800. As shown in FIGS. 8A and 8B, the rotors 204(1) and 204(4) are aligned in a first plane while rotors 204(2) and 204(3) are aligned in a second, different plane. FIG. 8C shows a top view of an UAV 806 that is similar to the UAV 800 but includes all of the rotors 204 aligned in a same plane.

FIG. 9A shows a top view of an UAV 900 shown in the horizontal flight configuration 118 and is similar or the same as the UAV 102 shown in FIG. 3A except possibly as described below in this section. The UAV 900 includes a swept wing 802 that is configurable to transition between the horizontal flight configuration 118 (shown in FIG. 9A) and a vertical flight configuration. The swept wing 802 may include rotors proximate to a trailing edge of the swept wing 802 and control surfaces on the trailing edge of the swept wing 802 to enable the UAV 900 to maintain horizontal flight using lift generated by the swept wing 802. FIG. 9B shows a side view of the UAV 900. As shown in FIGS. 9A and 9B, the rotors 204(1) and 204(4) are aligned in a first plane while rotors 204(2) and 204(3) are aligned in a second, different plane. FIG. 9C shows a top view of an UAV 902 that is similar to the UAV 900 but includes all of the rotors 204 aligned in a same plane.

Figure 10:
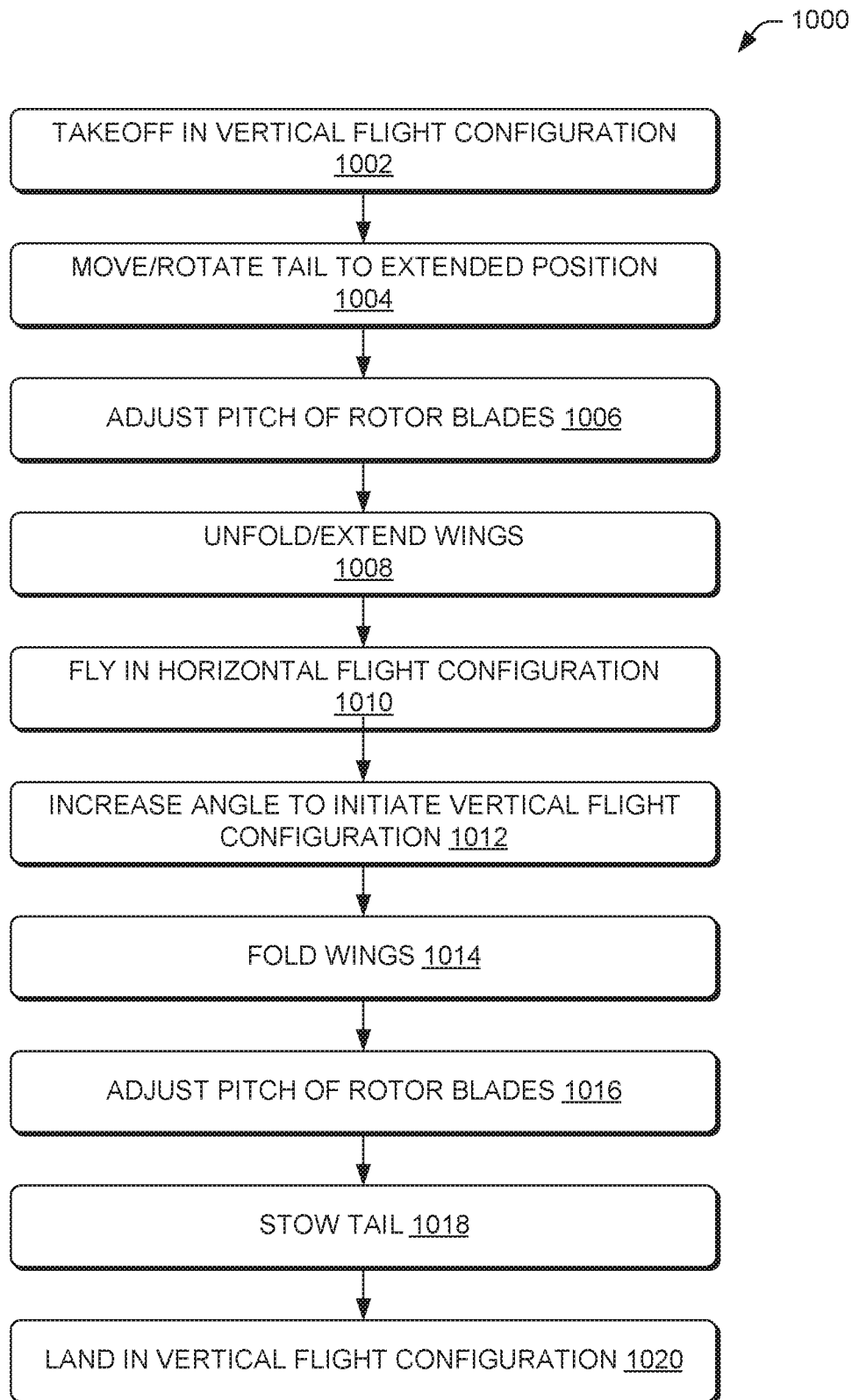
FIG. 10 is a flow diagram showing an illustrative process to transition the in-flight reconfigurable wing structure between a vertical flight configuration and a horizontal flight configuration.

FIG. 10 is a flow diagram showing an illustrative process 1000 to transition the in-flight reconfigurable wing structure between the vertical flight configuration and the horizontal flight configuration. The process 1000 is illustrated as a collection of blocks in a logical flow graph, which represent a sequence of operations. The order in which the operations are described is not intended to be construed as a limitation, and any number of the described blocks can be combined in any order and/or in parallel to implement the process 1000.

At 1002 the UAV 102 may be configured in the vertical flight configuration 110 shown in FIG. 3A. The wing segments may position the rotors units around the center of mass of the UAV 102. The UAV 102 may power up rotors by supplying power to electric motors coupled to the rotors. The rotors may generate downward thrust to lift the UAV 102 off of the ground. The UAV 102 may lift off of the ground and assume vertical flight as a rotor craft. In some embodiments, the UAV 102 may takeoff with the fore end of the fuselage 202 pointed downward. This orientation may be ideal in some instances to enable the sensor 214 to be used during landing to identify a landing zone, and so forth. In some embodiments, the UAV 102 may be rotated prior to takeoff to orient the fore end of the fuselage 202 upwards toward the sky and away from the ground.

At 1004, the UAV 102 may rotate a tail from a stowed position to an extended position when the tail is configured to be stowed for takeoff and landing. However, when the UAV 102 includes a swept wing design, the operation 1004 (and similar operations) may not be preformed.

At 1006, after the UAV 102 has flown to at least a predetermined distance above the ground level, a pitch of rotor blades of the UAV 102 may be adjusted to reverse a direction of thrust produced by the rotors. For example, when the UAV 102 takes off with the fore end of the fuselage 202 pointed downward, the UAV 102 may require thrust in a first direction for takeoff and vertical flight in the vertical flight configuration and thrust in a second, opposite direction (relative to the propulsion unit) to assume horizontal flight in the horizontal flight configuration. Thus, the UAV 102 may adjust a pitch of the rotor blades between a positive pitch and a negative pitch to reverse the thrust produced by the rotors. During the reverse of the thrust, the UAV 102 may rely on current momentum to maintain flight.

At 1008, the UAV 102 may unfold/extend the wings such that the wing segments become aligned substantially parallel to one another, thereby transforming the wing into a conventional fixed wing configuration.

At 1010, the UAV 102 may assume horizontal flight in the horizontal flight configuration 118 shown in FIG. 2A, where the fore end of the fuselage 202 is directed in the direction of travel. By traveling horizontally in the horizontal flight configuration 118, the UAV 102 may conserve energy and reach greater speed as compared to horizontal flight in the vertical flight configuration 110.

At 1012, typically when the UAV 102 has approached or is near a landing zone, the UAV may transition to the vertical flight configuration 110 and land using vertical flight. However, in some embodiments, the UAV 102 may land in the horizontal flight configuration 118, such as in emergency situations, when UAV 102 is equipped with landing gear (e.g., wheeled landing gear, skis, reinforced hull/fuselage, pontoons, etc.), and/or possibly in other situations. To begin the transition to the vertical flight configuration 110, at 1012, the UAV 102 may increase an angle of attack upwards to increase the pitch of the UAV 102.

At 1014, the UAV 102 may begin to fold the wings to assume the vertical flight configuration 110 shown in FIG. 3A.

At 1016, before the UAV 102 drops below a predetermined distance above the ground level, a pitch of rotor blades of the UAV 102 may be adjusted to reverse a direction of thrust produced by the rotors. For example, when the UAV 102 is to land with the fore end of the fuselage 202 pointed downward, the UAV may require thrust in a first direction to assume flight in the horizontal flight configuration and thrust in a second, opposite direction (relative to the propulsion unit) for flight and landing in the vertical flight configuration. Thus, the UAV 102 may adjust a pitch of the rotor blades between a positive pitch and a negative pitch to reverse the thrust produced by the rotors. During the reverse of the thrust, the UAV 102 may rely on current momentum to maintain flight.

At 1018, the UAV 102 may perform vertical flight in the vertical flight configuration. At 1018, the UAV 102 may fold or stow the tail by rotating the tail from the extended position to the stowed position when the UAV 102 includes the tail. However, when the UAV 102 includes a swept wing design, the operation 1018 may not be preformed.

At 1020, the UAV 102 may land in the vertical flight configuration and discontinue vertical flight by powering down electric motors that drive the rotors.

When the UAV 102 is configured with the cargo using the swing arm, the UAV 102 may release cargo while performing flight in the horizontal flight configuration at the operation 1010. Landing gear and/or a special takeoff/landing zone may accommodate clearances to enable use of the swing arm and cargo by the UAV 102.

Figure 11:
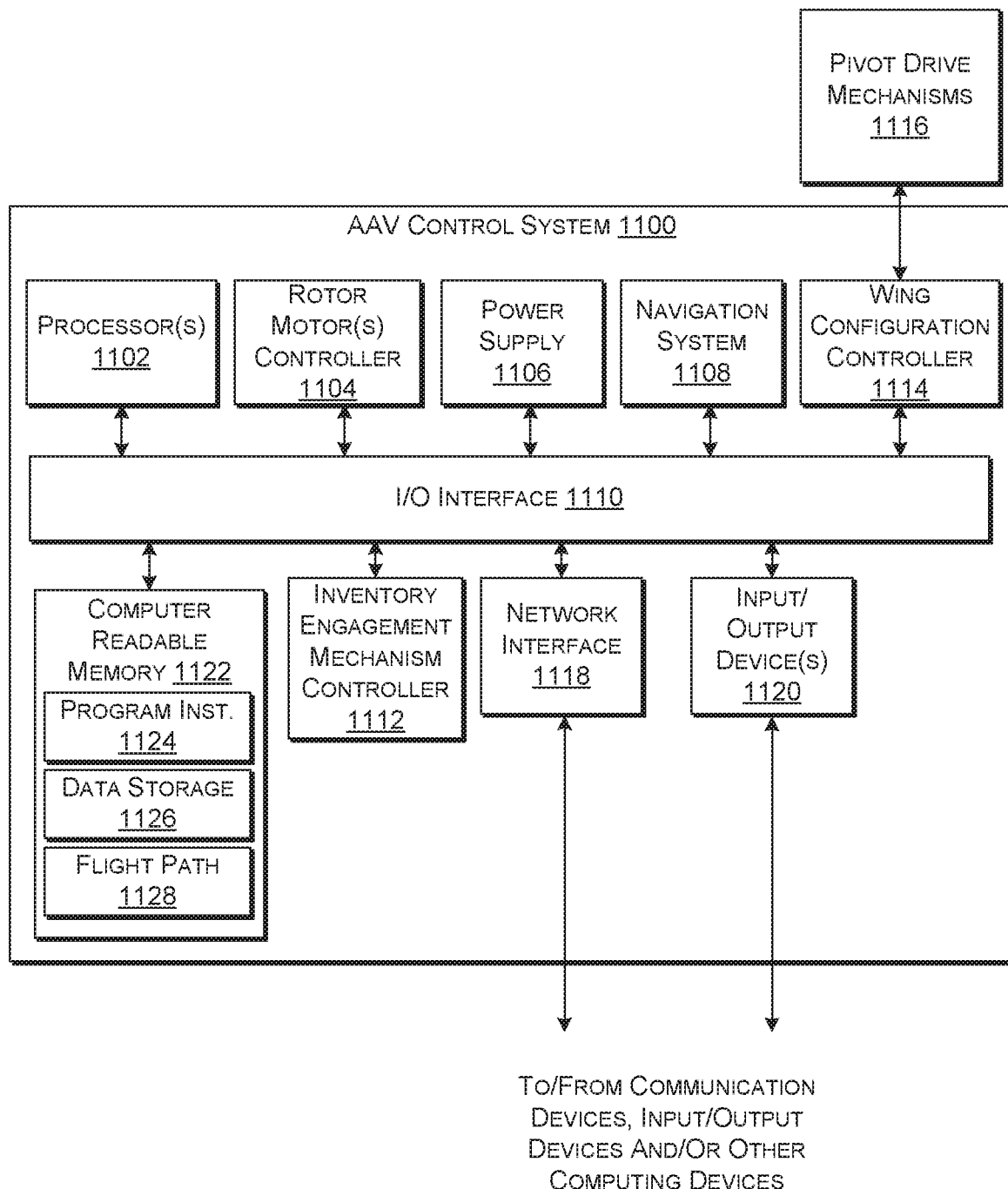
FIG. 11 is a block diagram showing an illustrative control system of the UAV described herein.

FIG. 11 is a block diagram showing an illustrative control system 1100 that may be used to implement at least some of the techniques discussed above. In the illustrated implementation, the UAV control system 1100 includes one or more processors 1102, coupled to a non-transitory computer readable storage medium 1122 via an input/output (I/O) interface 1110. The UAV control system 1100 may also include a rotor motor controller 1104, power supply module 1106 and/or a navigation system 1108. The UAV control system 1100 further includes an inventory (cargo) engagement mechanism controller 1112, a wing configuration controller 1114, a network interface 1118, and one or more input/output devices 1120.

In various implementations, the UAV control system 1100 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1122 may be configured to store executable instructions, data, flight paths and/or data items accessible by the processor(s) 1102. In various implementations, the non-transitory computer readable storage medium 1122 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1122 as program instructions 1124, data storage 1126 and flight path data 1128, respectively. In other implementations, program instructions, data and/or flight paths may be received, sent or stored upon different types of computer-accessible media, such as non-transitory media, or on similar media separate from the non-transitory computer readable storage medium 1122 or the UAV control system 1100. Generally speaking, a non-transitory, computer readable storage medium may include storage media or memory media such as flash memory (e.g., solid state memory), magnetic or optical media (e.g., disk) coupled to the UAV control system 1100 via the I/O interface 1110. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1118.

In one implementation, the I/O interface 1110 may be configured to coordinate I/O traffic between the processor(s) 1102, the non-transitory computer readable storage medium 1122, and any peripheral devices, the network interface or other peripheral interfaces, such as input/output devices 1120. In some implementations, the I/O interface 1110 may perform any necessary protocol, timing or other data transformations to convert data signals from one component (e.g., non-transitory computer readable storage medium 1122) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1122, may be incorporated directly into the processor(s) 1102.

The rotor motor(s) controller 1104 communicates with the navigation system 1108 and adjusts the power of each rotor motor to guide the UAV along a determined flight path. In some embodiments, where the rotor blades are configured for variable pitch, the rotor motor(s) controller 1104 may adjust the pitch of the rotor blades. The power supply module 1106 may control the charging and any switching functions associated with one or more power modules (e.g., batteries) of the UAV, such as the power sources.

The navigation system 1108 may include a GPS or other similar system that may be used to navigate the UAV to and/or from a location. The inventory engagement mechanism controller 1112 communicates with the actuator(s) or motor(s) (e.g., a servo motor) used to engage and/or disengage inventory. For example, when the UAV is positioned over a level surface at a delivery location, the inventory engagement mechanism controller 1112 may provide an instruction to a motor that controls the inventory engagement mechanism to release the inventory.

The wing configuration controller 1114 may control one or more pivot drive mechanisms 1116 to cause the wings to maintain the vertical flight configuration 112 or the horizontal flight configuration 118 (possibly by engaging/disengaging locks or friction mechanisms) and/or to transition between the vertical flight configuration 112 or the horizontal flight configuration 118. For example, the wing configuration controller 1114 may cause servos or rotational motors to cause wing segments to rotate about a pivot as discussed herein. In some embodiments, the pivot drive mechanisms 1116 may include the propulsion unit or rotor motor and controllable by the wing configuration controller 1114, possibly using an engagement mechanism or gear that causes the power transmission to rotate the wing segments.

The network interface 1118 may be configured to allow data to be exchanged between the UAV control system 1100, other devices attached to a network, such as other computer systems, and/or with UAV control systems of other UAVs. For example, the network interface 1118 may enable wireless communication between numerous UAVs. In various implementations, the network interface 1118 may support communication via wireless general data networks, such as a Wi-Fi network. For example, the network interface 1118 may support communication via telecommunications networks such as cellular communication networks, satellite networks, and the like.

Input/output devices 1120 may, in some implementations, include one or more displays, image capture devices, thermal sensors, infrared sensors, time of flight sensors, accelerometers, pressure sensors, weather sensors, airflow sensors, etc. Multiple input/output devices 1120 may be present and controlled by the UAV control system 1100. One or more of these sensors may be utilized to assist in landings as well as avoiding obstacles during flight.

As shown in FIG. 11, the memory may include program instructions 1124 which may be configured to implement the example processes and/or sub-processes described above. The data storage 1126 may include various data stores for maintaining data items that may be provided for determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 1100 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 1100 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 1100. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 1100 may be transmitted to the UAV control system 1100 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An aircraft, comprising:
a fuselage;
opposed wings extending from opposed sides of the fuselage;
a plurality of engines, wherein at least one engine is mounted to each of the opposed wings;
wherein at least a portion of each opposed wing including at least one of the engines rotates relative to the fuselage around a rotation axis that is non-perpendicular to a longitudinal axis of the fuselage between a first configuration adapted for vertical take-off and landing, and a second configuration adapted for horizontal flight,
wherein the plurality of engines provide lift to the aircraft in the first configuration.

2. The aircraft of claim 1, wherein the plurality of engines includes at least four engines, and wherein each portion of the opposed wings that rotates relative to the fuselage includes at least two engines mounted thereto.

3. The aircraft of claim 1, wherein at least one of the plurality of engines is at least one of an electric engine or a combustion engine.

4. The aircraft of claim 1, further comprising at least one battery mounted to one of the opposed wings adjacent to one of the plurality of engines.

5. The aircraft of claim 1, wherein each of the opposed wings comprises a fixed portion extending from the fuselage and the portion that rotates relative to the fuselage outboard of the fixed portion.

6. The aircraft of claim 1, wherein, in the first configuration, an axis between a leading edge and a trailing edge of the at least one of the opposed wings is parallel to the longitudinal axis of the fuselage.

7. The aircraft of claim 1, wherein leading edges of each of the portions of the opposed wings face upward when the portions of the opposed wings that rotate are in the second configuration.

8. The aircraft of claim 1, wherein at least one of the plurality of engines is offset from the wing to which the at least one of the plurality of engines is mounted to such that when the wing to which the at least one of the plurality of engines is mounted is in the first configuration, the at least one of the plurality of engines is disposed between the wing and the fuselage.

9. The aircraft of claim 1, wherein, in the first configuration, an axis extending between an inboard end and an outboard end of the portion of each of the opposed wings is perpendicular to the longitudinal axis of the fuselage.

10. The aircraft of claim 9, wherein leading edges of each of the portions of the opposed wings that rotate face upward when the portions of the opposed wings are in the second configuration.

11. The aircraft of claim 1, further comprising landing gear.

12. The aircraft of claim 11, wherein the landing gear comprises at least one of a wheel, a ski or a pontoon.

13. The aircraft of claim 5, wherein the fixed portion and the portion that rotates of each of the opposed wings are coupled by a pivot joint.

14. The aircraft of claim 5, wherein each of the opposed wings further comprises an actuator to control rotation of the portion that rotates relative to the fixed portion.

15. The aircraft of claim 1, wherein each of the opposed wings has an airfoil shape.

16. An aircraft, comprising:
a fuselage;
opposed wings extending from opposed sides of the fuselage;
a plurality of engines, wherein at least one engine is mounted to each of the opposed wings;
wherein at least a portion of each opposed wing including at least one of a plurality of engines rotates relative to the fuselage around a rotation axis that is non-perpendicular to a longitudinal axis of the fuselage between a first configuration adapted for vertical take-off and landing, and a second configuration adapted for horizontal flight, and
wherein the wings do not produce lift in the first configuration.

17. A vertical take-off or landing method, comprising:
rotating at least a portion of a wing having an engine mounted thereto relative to a fuselage around a rotation axis that is non-perpendicular to a longitudinal axis of the fuselage to orient the engine and a leading edge of the wing vertically for hovering;
actuating the engine to produce vertical lift; and
rotating the at least portion of the wing having the engine mounted thereto to orient the engine and a leading edge of the wing horizontally for forward flight.

18. The method of claim 17, wherein a leading edge of the wing faces upward when the wing is oriented vertically.

19. The method of claim 17, wherein rotating at least the portion of the wing comprises:
pivoting the at least portion of the wing about a pivot joint disposed in the wing.

20. The method of claim 17, wherein rotating at least the portion of the wing comprises:
rotating at least the portion of the wing having the engine mounted thereto to orient the leading edge of the wing vertically by hydraulic or electrical actuation.

* * * * *